United States Patent [19]

Mehrotra et al.

[11] 4,408,315

[45] Oct. 4, 1983

[54] VIDEO DISC PLAYER HAVING STYLUS CLEANING APPARATUS

[75] Inventors: Gopi N. Mehrotra, Carmel; Gerald Van Arsdall, Greenwood, both of Ind.

[73] Assignee: RCA Corporation, New York, N.Y.

[21] Appl. No.: 306,454

[22] Filed: Sep. 28, 1981

[51] Int. Cl.³ ............................................. G11B 3/58
[52] U.S. Cl. ................................................... 369/71
[58] Field of Search .................. 369/71, 72, 73, 74

[56] References Cited

U.S. PATENT DOCUMENTS

| | | | |
|---|---|---|---|
| 4,046,384 | 9/1977 | Kirschner | 369/71 |
| 4,166,623 | 9/1979 | Nanbu et al. | 369/71 |
| 4,285,524 | 8/1981 | Hughes et al. | 369/71 |

Primary Examiner—Steven L. Stephan
Attorney, Agent, or Firm—E. M. Whitacre; J. S. Tripoli; D. A. Kulkarni

[57] ABSTRACT

A stylus cleaner arm is pushed back to a retracted position when a record-bearing caddy is inserted into the player to load an enclosed record therein. The cleaner arm is held in the retracted position by a record retaining spine upon subsequent jacket withdrawal. The cleaner arm follows the caddy as it is withdrawn from the player after record playback. The cleaner arm engages a switch which actuates a stylus lowering device to lower a pickup stylus onto a cleaning pad disposed on the cleaner arm. The cleaning pad wipes the stylus as the cleaner arm swings back. A timing device deenergizes the stylus lowering device after a preselected time interval to lift the stylus away from the cleaning pad.

4 Claims, 6 Drawing Figures

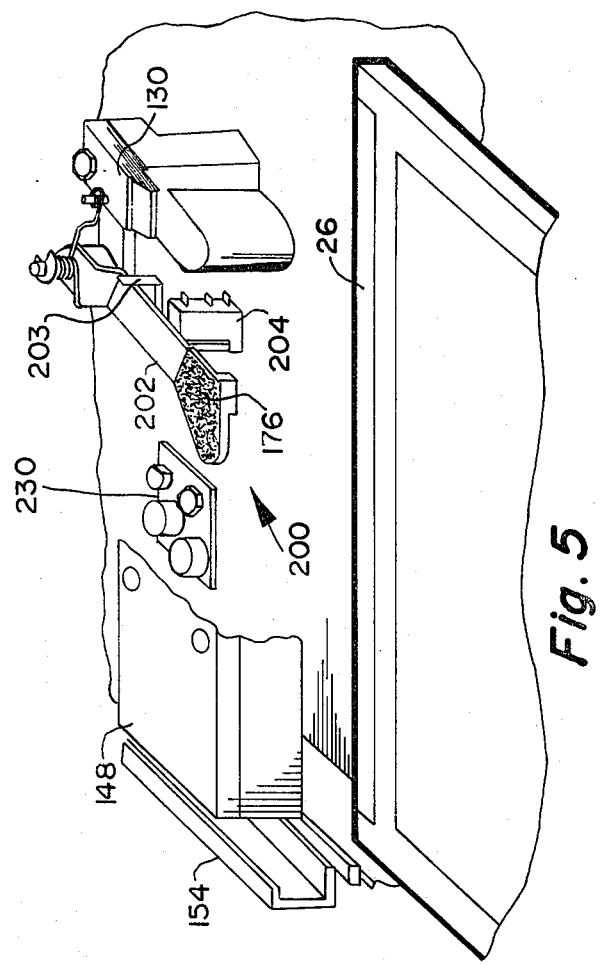
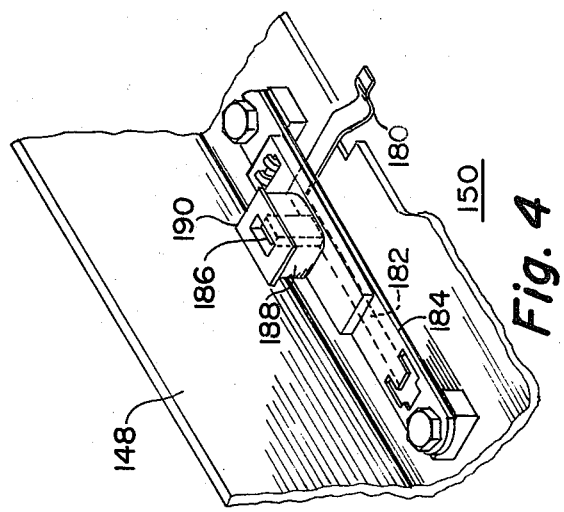

VIDEO DISC PLAYER HAVING STYLUS CLEANING APPARATUS

This invention relates to record players, and more particularly, to a system for automatically cleaning the pickup stylus employed in a video disc player.

In certain systems, picture and sound signals are stored on a disc record in the form of physical undulations in a continuous spiral track disposed on the record surface. The variations in electrical capacitance between an electrode disposed on a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a protective caddy which comprises an outer sleeve and a record retaining spine. The spine is provided with an opening in which a record is received, thereby forming a record/spine assembly. For record loading, a full caddy is inserted into the player along a pair of guide rails provided in the player. A record extraction mechanism disposed in the player removes the record/spine assembly from the sleeve for retention in the player on a set of receiving pads during subsequent sleeve withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty sleeve is then reinserted into the player to retrieve the record/spine assembly.

The pickup stylus is, typically, disposed at one end of a stylus arm having the other end secured to a protective cartridge by means of a flexible coupler. The flexible coupler allows the stylus to follow the vertical and horizontal movements of the record surface (e.g., warp, eccentricity, etc.). The cartridge is mounted in a carriage having an opening in the bottom wall thereof through which the pickup stylus protrudes, when lowered, for record engagement. The carriage is fitted with a selectively-operated stylus lowering device or a lifter. Typically, the stylus lifter is spring biased upward. The lifter further includes an electro-magnet which, when activated, overcomes the spring force to lower the stylus. During playback, the carriage is translated from a preset starting position at the back of the player toward the record center so as to follow the radially inward motion of the stylus. In such systems, it is advantageous to reset the carriage to the starting position during the insertion of an empty sleeve into the player. The front edge of the sleeve engages the carriage to drive it back to the starting position.

In the course of playback operations, an accumulation of debris (e.g., particles of material fragmented from the stylus or the disc) can develop on the stylus tip. This may interfere with proper sensing of the minute groove bottom variations. To reduce adverse effects of such debris accumulation, it is desirable to provide a system for automatically cleaning the stylus.

In U.S. Pat. No. 4,285,524 issued to Hughes et al., a caddy-actuated stylus cleaning mechanism is disclosed. In the therein disclosed system, the front edge of the caddy engages a spring-loaded cleaner arm mounted at the back of the player to deflect it from a standby position to a retracted position. The retained spine holds the cleaner arm in the retracted position when the sleeve is extracted from the player. When the record/spine assembly is retrieved from the player, the cleaner arm follows the outward travel of the assembly until it is arrested by a latch member at an intermediate position thereof. The location of the intermediate position of the cleaner arm is such that the stylus is disposed over a cleaning pad mounted on the cleaner arm. As the full caddy is withdrawn from the player, a switch is actuated to lower the stylus onto the cleaning pad, and, the latch plate is retracted to release the detained cleaner arm to return to its standby position. The cleaning pad wipes the stylus clean as the cleaner arm swings back to its original position.

In accordance with the present invention, the improved stylus cleaning apparatus includes a switch which is actuated when the stylus is occupying a position over a cleaning pad as it passes underneath the stylus. A control means, responsive to the actuation of the switch, energizes the stylus lowering device to lower the stylus onto the cleaning pad during passage thereof beneath the stylus to clean the stylus. A timing means turns off the control means after a preselected time interval to lift the stylus away from the cleaning pad.

In the Drawings:

FIG. 4 represents a stylus lifter suitable for use with the present stylus cleaning mechanism;

Figure 1:
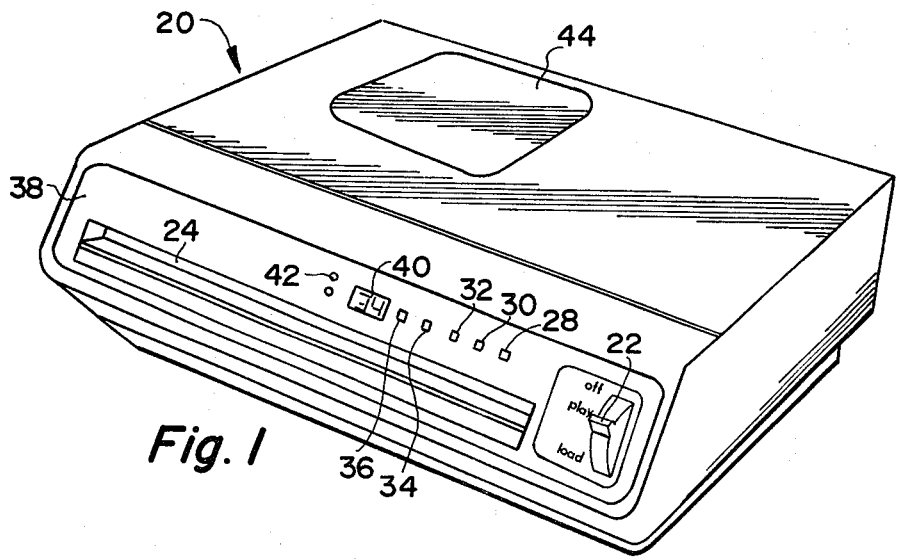
FIG. 1 shows a video disc player incorporating a stylus cleaning mechanism in accordance with the subject invention.
Figure 3:
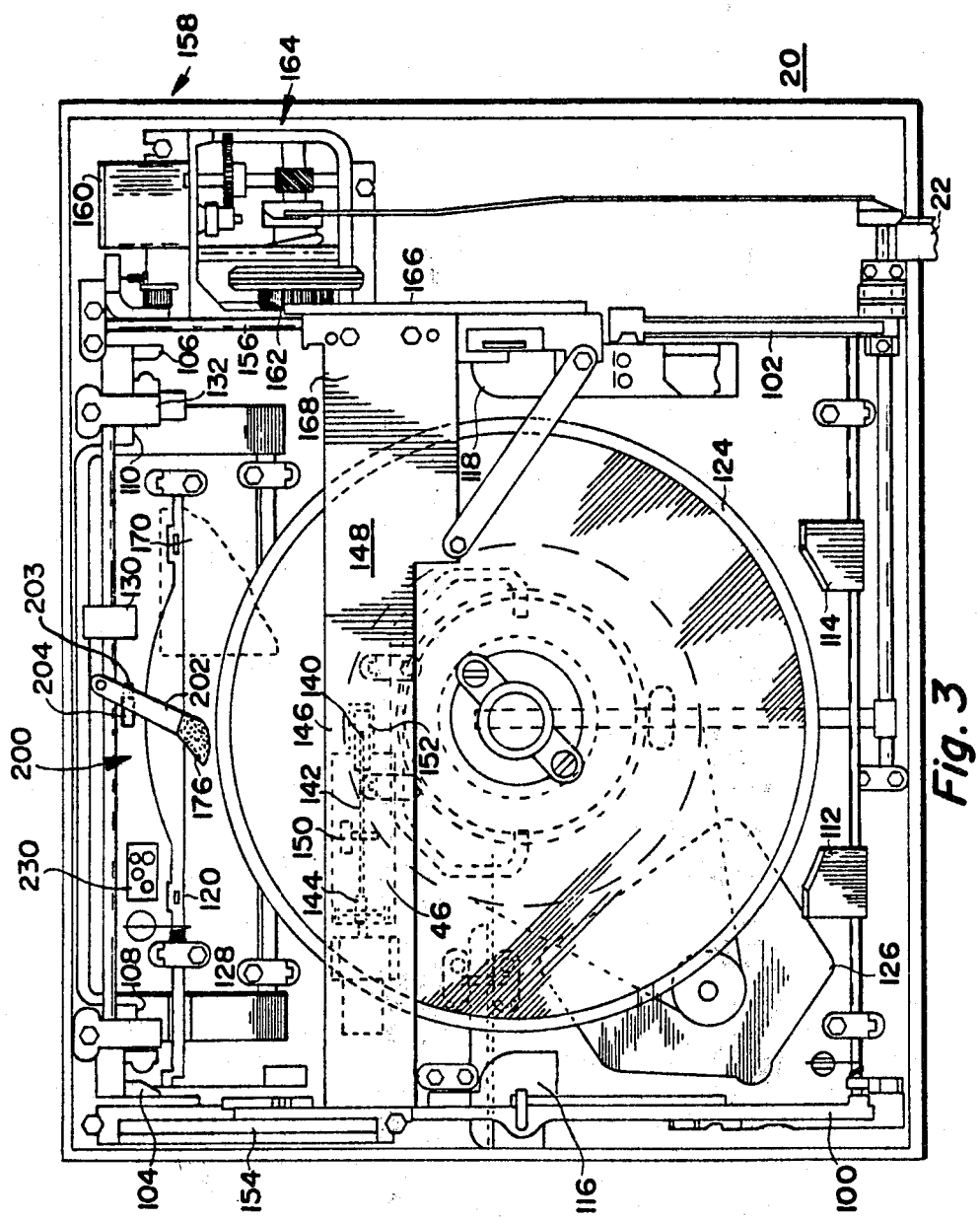
FIG. 3 is a plan view of the FIG. 1 player with its cover removed to depict the inside mechanism.
Figure 6:
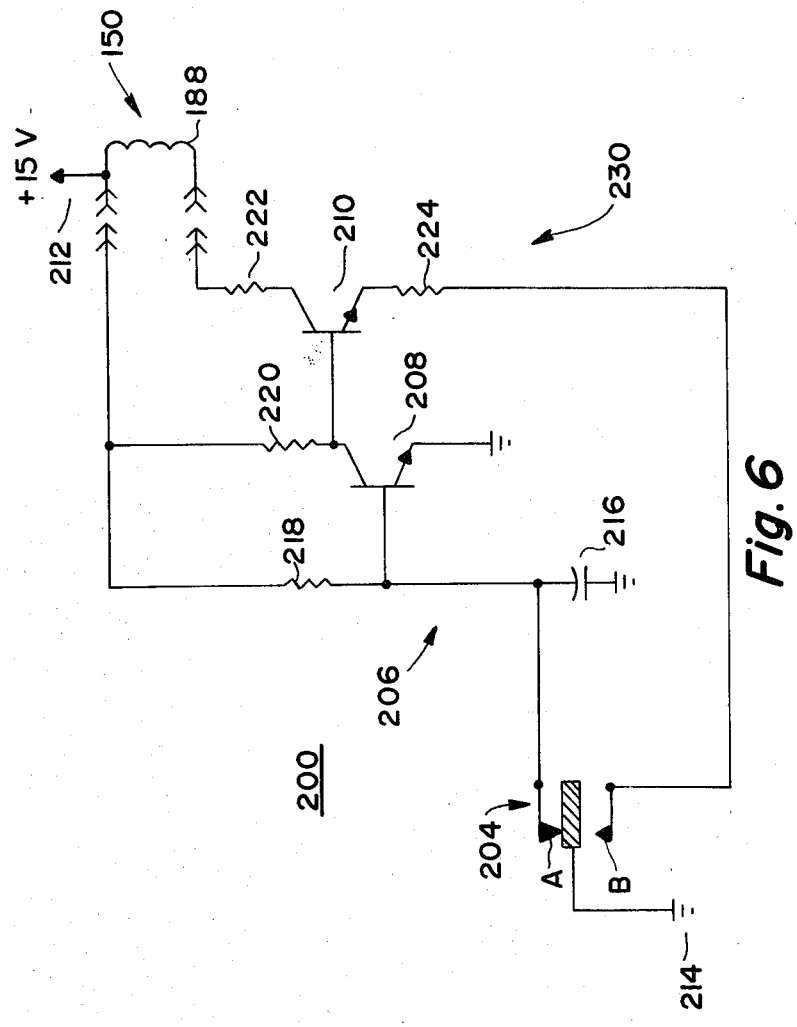

FIG. 5 provides a perspective view of the player of FIGS. 1 and 3 illustrating the details of the instant stylus cleaning mechanism; and FIG. 6 gives a circuit diagram of the instant stylus cleaning mechanism.

Shown in FIG. 1 is a video disc player 20 incorporating the present stylus cleaning apparatus. A function lever 22 on the front side of the player is subject to disposition in any one of three positions—OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the prerecorded program. During rapid access, the pickup device is lifted, and rapidly moved sideways. In visual search, the pickup device is rapidly moved radially while engaging the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 3, so that it can be changed when required.

Figure 2:
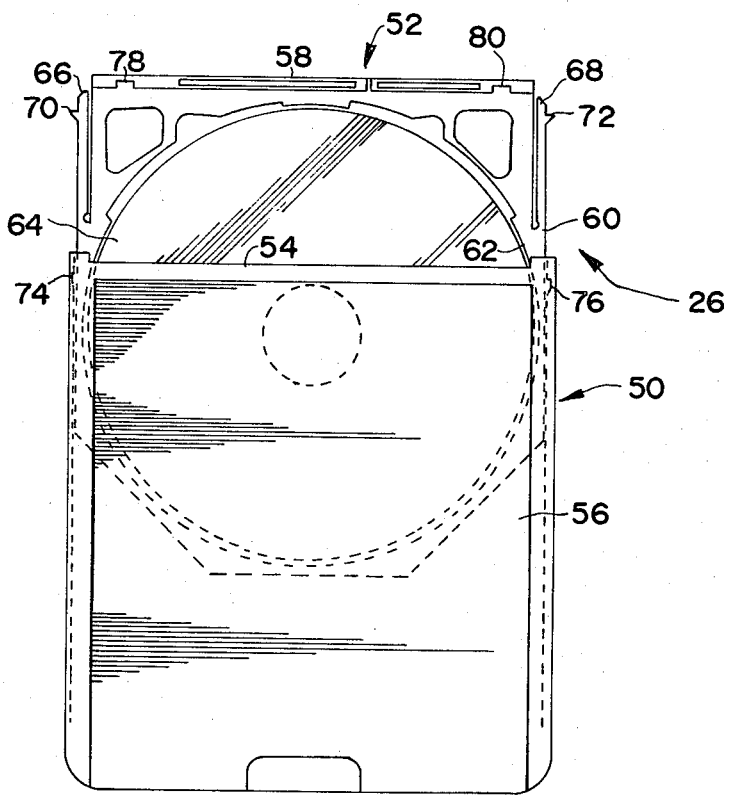
FIG. 2 illustrates a video disc caddy suitable for use with the player of FIG. 1 in the practice of this invention.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-aperatured record 64. The spine 52 is further fitted with integrally-molded, flexural latch fingers 66 and 68. Each of the spine latch fingers 66 and 68 has a protruding element 70 and 72, which are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later.

The operation of a record loading/unloading mechanism provided in the player will first be explained in conjunction with FIG. 3. To insert a record, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144.

The cartridge 46 is placed in a compartment 146 provided in a stylus arm carriage 148, and the carriage lid, not shown, is closed.

A stylus arm lifter 150 is mounted in the carriage 148 to selectively lower the pickup stylus 140 through an opening 152 provided in the bottom wall of the carriage to effect record engagement. The details of the lifter 150 will be explained later in conjunction with FIG. 4. During playback, the carriage 148 is translated on guide ways 154 and 156 disposed parallel to the caddy side rails 100 and 102 from a starting position at the back of the player toward the front of the player in synchronism with the radially inward motion of the pickup stylus 140. The carriage drive mechanism 158 comprises a servo-controlled motor 160 which drives a pinion 162 through a gear train 164. The pinion engages a rack 166 secured to the underside of the carriage 148 to translate the carriage along the guide ways 154 and 156 in such a way as to keep the pickup stylus 140 centered in the cartridge 46.

During playback, the variations in electrical capacitance between an electrode carried by the stylus 140 and a conductive property of the record 64, in correspondence to the rises and falls of the disc surface under the stylus end, are sensed by pickup circuitry 168 to reproduce the stored information on the record. The recovered signals are processed by signal processing circuits 170 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

To retrieve the record/spine assembly, the empty jacket 50 is inserted into the player through the input slot 24 along the caddy side rails 100 and 102. As the jacket 50 is driven into the player, the front edge thereof engages the carriage 148 to push it back to a preset travel limit stop defining the starting position, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

The stylus arm lifter 150 will now be described in reference to FIG. 4. The lifter 150 is activated to lower the stylus 140 as required for proper player operation. The stylus is lowered during normal play and visual search. Furthermore, the stylus 140 is set down onto a cleaning pad 176 disposed at the back of the player each time the record is extracted from the player in the manner described later. In all other conditions, including power off, the stylus 140 is lifted upward.

The lifter 150 comprises a stylus support arm 180 integrally disposed at one end of a leaf spring 182. The other end of the leaf spring 182 is fixedly attached to a carriage-mounted bracket 184. Disposed on the leaf spring 182, near its free end, is a small permanent magnet 186, which is subject to reception within the winding 188 of an electromagnet 190. When an appropriate polarity pulse is applied to the winding 188 of the electromagnet 190, it generates a repelling force on the magnet 186 which overcomes the upward force exerted by the leaf spring 182 to cause the stylus 140 to come down.

The player, in accordance with this invention, is fitted with a stylus cleaning apparatus 200 depicted in FIGS. 5 and 6. When a loaded caddy is inserted into the player to deposit a record on the turntable 124, its front edge engages a spring-loaded cleaner arm 202, carrying the cleaning pad 176, to drive it back from an initial position to a retracted position. The cleaner arm 202 is held in the retracted position by the record retaining spine 52 when the empty jacket 50 is withdrawn. To retrieve the record/spine assembly, the empty jacket is inserted into the player in the manner hereinbefore indicated. As the loaded caddy is removed from the player, the cleaner arm 202 follows the exit travel of the caddy. The cleaner arm 202 actuates the lever 203 of a single pole double throw switch 204 at a point where the cleaning pad 176 is underneath the pickup stylus 140. Actuation of the switch 204 energizes the stylus lifter 150 to lower the stylus 140 onto the cleaning pads 176 as the cleaner arm 202 swings back to the initial position, whereby the stylus is cleaned. A timing device 206, triggered by the switch 204, turns off the stylus lifter 150 after a preset time interval to raise the stylus 140.

The sequence of operation will now be explained in greater detail in conjunction with the circuit diagram in FIG. 6. When the player is turned on, the sections A and B of the single pole double throw switch 204 are, respectively, opened and closed. The sections A and B of the switch 204 will be hereinafter referred to as the switches "A" and "B" respectively. Initially, the transistors 208 and 210 are, respectively, off and on. A voltage source 212 drives current through the lifter winding 188, the transistor 210 and switch B to the ground 214. The activation of the stylus lifter 150 lowers the stylus 140. Switch A being open, a capacitor 216 starts charging through a resistor 218. When the voltage across the capacitor 216 reaches a certain level, the transistor 208 is turned on, which, in turn, turns off the transistor 210, whereby the current through the lifter winding 188 is cut off and the stylus 140 is raised as a result of the spring bias associated with the lifter mechanism 150. The time it takes to trigger the transistors 208 and 210 depends upon the relative values of the resistor 218 and the capacitor 216. Any suitable response time between 200 milliseconds to one second may be used.

As a full caddy is inserted into the player to load a record therein, the front edge thereof engages the cleaner arm 202 and displaces it to the retracted position thereof as previously pointed out. At an intermediate position of the cleaner arm 202, it closes switch A and opens switch B through the lever 203 of the switch 204. The closure of switch A, grounds the capacitor 216, thereby turning off the transistor 208 and turning on the transistor 210. The open switch B prevents passage of current through the lifter winding 188, whereby the stylus 140 remains raised during caddy loading.

The jacket is extracted from the player after the arrival of the caddy at the fully inserted position in the player, leaving the record/spine assembly inside the player. The cleaner arm 202 is held in the retracted position by the retained spine. The empty jacket is inserted into the player to retrieve the record after playback. There is no change in the status of the circuit elements during these operations.

The cleaner arm 202 follows the exit motion of the caddy as it is withdrawn from the player. When the cleaner arm 202 reaches the intermediate position thereof which corresponds to the arrival of the cleaning pad 176 underneath the stylus 140, it opens switch A and closes switch B. The closure of switch B sends current through the lifter winding 188 and the transistor 210, thereby lowering the stylus 140 onto the cleaning pad 176. The cleaning pad 176 cleans the stylus 140 as the cleaner arm 202 swings thereunder from the intermediate position to the initial position thereof. When switch A opens, the capacitor 216 starts charging through the resistor 218, and turns on the transsistor 208 after the elapse of a preset time interval. When the transistor 208 switches on, the transistor 210 switches off, whereby the current flowing through the lifter winding 188 is blocked off and the stylus 140 is raised. The transistors 208 and 210 are turned off when the player is switched off.

Illustratively, the specifications of the circuit elements are as set forth below. The various circuit elements are collectively identified by numeral 230 in FIGS. 3 and 6.

| TABLE OF VALUES | | |
| --- | --- | --- |
| | Element | Specification |
| (1) | Transistor 208 | RCA 2N3904 |
| (2) | Transistor 210 | RCA 2N3015 |
| (3) | Capacitor 216 | 47 Microfarads |
| (4) | Resistor 218 | 33 Kilohms |
| (5) | Resistor 220 | 47 Kilohms |
| (6) | Resistor 222 | 68 Ohms |
| (7) | Resistor 224 | 18 Ohms |

The design of the instant stylus cleaner is simple, reliable and cost effective.

What is claimed is:

1. In a record player including a pickup stylus subject to engagement with a turntable-supported record for recovering prerecorded information from said record; said stylus being mounted at one end of a stylus arm; the other end of said stylus arm being supported in a carriage which is subject to translatory motion along a path between a starting position and an ending position; said player further including means for selectively lowering said stylus which activated; stylus cleaning apparatus comprising:

(A) a stylus cleaning element;
(B) means for causing relative motion between said cleaning element and said stylus;
(C) means for sensing when said cleaning element is occupying a position beneath said stylus;
(D) control means responsive to said cleaning element position sensing means for activating said stylus lowering means to lower said stylus onto said stylus cleaning element;
(E) timing means responsive to said cleaning element position sensing means for deactivating said stylus lowering means after a preset time interval to lift said stylus away from said cleaning element.

2. Apparatus as defined in claim 1 wherein said sensing means comprises a mechanically-actuated switch which is operated when said cleaning element is underneath said stylus.

3. Apparatus as defined in claim 2 for use with said player wherein said stylus lowering means includes a magnetic element secured to a stylus arm rest and an electrical winding which, when energized, acts upon said magnetic element to lower said stylus arm rest and thereby said stylus arm; said electrical winding, said control means and said switch being disposed in series between a voltage source and ground; said control means, when turned on, allowing passage of electrical current through said winding to lower said stylus onto said cleaning element upon actuation of said switch; said timing means serving to automatically turn off said control means upon elapse of said preset time interval to block any current from flowing through said winding, whereby said stylus is lifted upward.

4. In a record player including a pickup stylus subject to engagement with a turntable-supported record for recovering prerecorded information from said record; said stylus being mounted at one end of a stylus arm; the other end of said stylus arm being supported in a carriage which is subject to translatory motion along a path between a starting position and an ending position; said player further including means for selectively lowering said stylus when activated; said stylus lowering means including a magnetic element secured to a stylus arm rest and an electrical winding which, when energized, acts upon said magnetic element to lower said stylus arm rest and thereby said stylus arm; stylus cleaning apparatus comprising:

(A) a stylus cleaning element;

(B) means for causing relative motion between said cleaning element and said stylus;

(C) means for sensing when said stylus is occupying a position over said cleaning element; said sensing means comprising a mechanically-actuated switch which is operated when said cleaning element is underneath said stylus;

(D) control means coupled to said sensing means for activating said stylus lowering means, whereby said stylus is made to contact said stylus cleaning element; said electrical winding, said control means and said switch being disposed in series between a voltage source and ground; said control means, when turned on, allowing passage of electrical current through said winding to lower said stylus onto said cleaning element upon actuation of said switch; and (E) timing means responsive to said sensing means for automatically turning off said control means upon elapse of a preset time interval to block any current from flowing through said winding, whereby said stylus is lifted upward away from said cleaning element; wherein said timing means comprises a series resistor/capacitor combination connected between said voltage source and said ground to automatically turn off said control means.

* * * * *